Dec. 22, 1964         J. R. WELLS ETAL         3,162,086
              DIAPHRAGM TYPE PLASTIC FASTENER
Filed July 3, 1961                            2 Sheets-Sheet 1
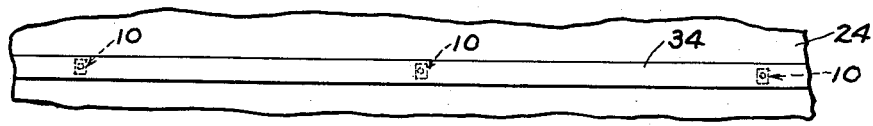
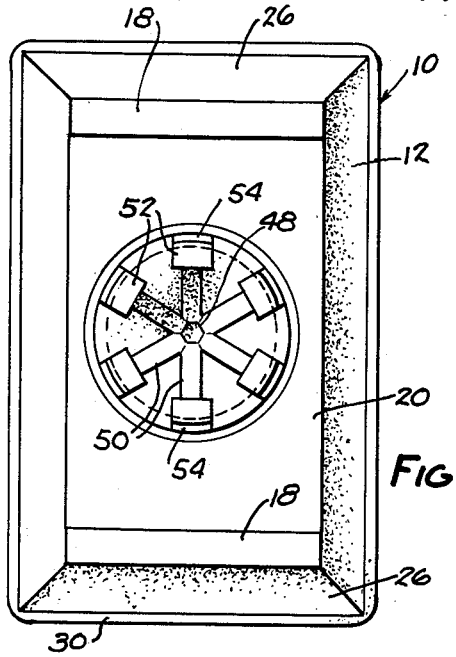
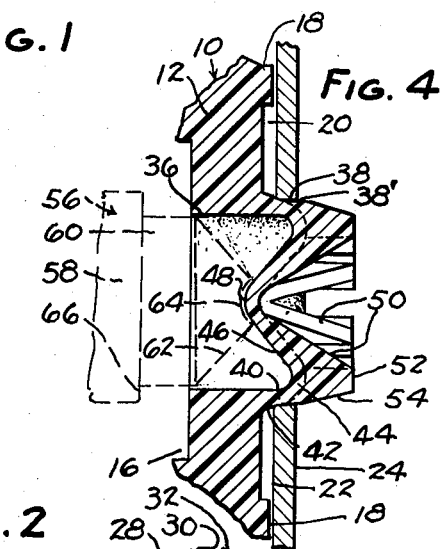
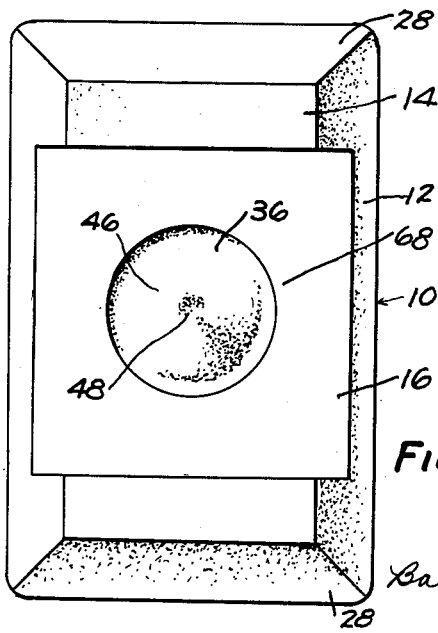
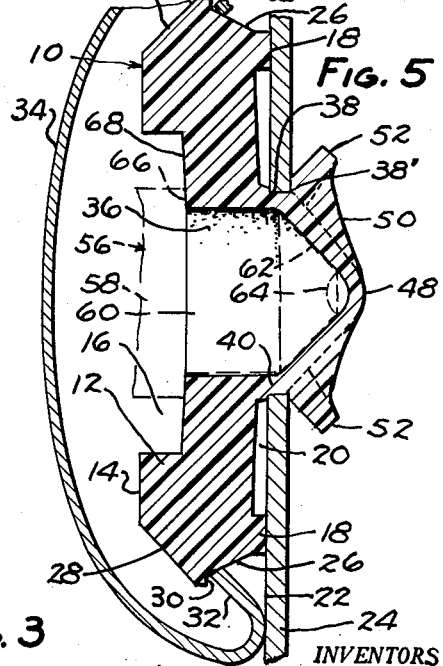
INVENTORS
JOHN R. WELLS &
ROBERT L. BROWN
BY
Barnes, Kisselle, Raisch & Choate
ATTORNEYS Dec. 22, 1964   J. R. WELLS ETAL   3,162,086
DIAPHRAGM TYPE PLASTIC FASTENER
Filed July 3, 1961   2 Sheets-Sheet 2

INVENTORS
JOHN R. WELLS &
BY ROBERT L. BROWN
Barnes, Kisselle, Raisch & Choate
ATTORNEYS

United States Patent Office 3,162,086
Patented Dec. 22, 1964

3,162,086
DIAPHRAGM TYPE PLASTIC FASTENER
John R. Wells, Detroit, Mich., and Robert L. Brown, Ferndale, Mich. (% Robin Products Co., 27027 Groesbeck Highway, Warren, Mich.); said Wells assignor to said Brown
Filed July 3, 1961, Ser. No. 121,732
16 Claims. (Cl. 85—82)

This invention relates to a fastener and more particularly to a fastener of the type adapted to be mounted on an apertured panel. The fastener of this invention is especially adapted for securing trim moldings on vehicle body panels.

It is common practice in the automotive industry to secure trim moldings on body panels by means of fasteners mounted in apertures on the panels, the fasteners having means thereon for engaging the flanges of the trim molding. The use of metal fasteners for such purposes has been common for many years. Such metal fasteners, however, have many problems associated therewith which, in many instances, result in higher production costs. For example, unless such metal fasteners are plated, they are apt to rust; and after a period of time, they present an unsightly appearance.

Another problem involved with the use of metal fasteners is the difficulty encountered in sealing the hole in the body panel in which the fastener is secured so as to prevent water from penetrating through the body panel to the interior of the vehicle.

It is an object of the present invention to provide a fastener admirably suited for mounting trim moldings on a body panel, the fastener being formed of plastic so that it will not rust and at the same time, it can be fashioned such that it seals the hole in the body panel when it is secured in place on the body panel.

A further object of the present invention resides in the provision of a fastener formed of plastic material such as nylon or the like and which is so designed that it can be very securely and permanently mounted on an apertured panel in a simple manner and requiring access only from one side of the panel.

In the drawings:

FIG. 1 is a fragmentary elevational view of a body panel having a trim molding mounted thereon by means of fasteners of the present invention.

FIG. 2 is a plan view of the fastener as seen from the bottom side thereof.

FIG. 3 is a plan view of the fastener as seen from the top side thereof.

FIG. 4 is a fragmentary vertical sectional view of the fastener arranged on a sheet metal panel in the unclinched or unlocked condition.

FIG. 5 is a view similar to FIG. 4 and showing the fastener in the clinched or locked condition and the manner in which it is adapted to engage a trim molding.

Figure 6:
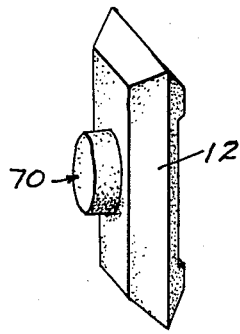
FIG. 6 is a perspective view of another form of fastener according to the present invention.

Referring to the drawings, one form of fastener according to the invention is generally designated 10 and comprises an integral member molded from a plastic material such as nylon or the like, which material is bendable, resilient and adapted to flow under moderate pressure. By the term flow, we mean that the material has the ability to thin out when stretched and to thicken when subjected to endwise compression. This material also has the property of elastic memory. These are important features of the fastener of this invention; and in this respect, the fastener is very different from sheet metal fasteners which are made from either a dead soft or a spring material. Nylon is only one of several plastic materials having the above described properties.

The fastener has a body member 12 which, in the form shown, is generally rectangular in shape. The top side 14 of body member 12 is recessed as at 16 and the bottom side is fashioned with a pair of pads 18 at opposite ends and between which the body member is recessed as at 20. Pads 18 are adapted for seating against the upper or exposed face 22 of a sheet metal panel 24. Each end of the fastener is provided with an upwardly and downwardly converging faces 26 and 28 which meet in a middle plane to form a lip 30 under which the free edges of inturned flanges 32 of a trim molding 34 are adapted to engage.

At the central portion of body member 10, there is molded a socket 36 which is open at the upper face of the fastener. In the fastener illustrated, socket 36 is of round cylindrical form and is adapted to be used in conjunction with panels 24 having round apertures 38 therein. On the underside of body member 12, there is molded an annular flange 40 which is relatively thin as compared with the thickness of body member 12. The inner surface of ange 40 forms a continuation of socket 36. At the junction of the outer face of flange 40 and body member 12, the flange has a frusto conical portion 42 which tapers inwardly and downwardly. At its lower end, flange 40 turns radially inwardly as at 44 and then upwardly as at 46 to form an upwardly projecting cone, the apex of which is located centrally within socket 36 as at 48. In effect, cone 46 and the rounded corner portion 44 provide a diaphragm closing the lower end of socket 36.

On the under or bottom side of the diaphragm, there are formed a plurality of ribs 50. These ribs emanate radially from adjacent the apex 48 of the conical portion 46 of the diaphragm. As is illustrated in FIGS. 2 and 4, ribs 50 taper in height such that they merge with the diaphragm adjacent the apex 48 and have a maximum height in the area of the radially inwardly turned corner 44 of the diaphragm. Ribs 50 at their radially outer ends are preferably fashioned with enlarged abutments 52 having a circumferential dimension greater than the thickness or circumferential dimension of the ribs 50. The enlarged abutments 52 at their upper ends merge with the outer surface of flange 40 just below the inwardly tapered portion 42. The radially outer surfaces of abutments 52 taper radially inwardly in a downward direction as indicated at 54.

In securing the fastener described to an apertured sheet metal panel, the fastener is placed against the panel with the enlarged abutments 52 projecting through the opening 38 in the panel. The opening 38 is dimensioned such that its diameter corresponds generally to the diameter of the circle formed by the radially outer faces of abutments 52 at their juncture with the tapered portion 42. It will be noted from FIG. 4 that the lower end of the tapered portion 42 is at a level below the lower faces of pads 18. Thus, under ideal and preferred conditions, the tapered portion 42 of flange 40 engages the edge of opening 38 and prevents the pads 18 from seating on panel 24 until downward pressure is applied to the fastener to thereby squeeze the tapered portion 42 of flange 40 into the opening 38. If desired, the fastener can be designed such that pads 18 initially seat on the panel and the tapered portion 42 engages the opening 38 when the fastener is clinched in place.

It will also be noted that the lower end of flange 40 terminates above the lower edge 38' of opening 38 and that the rounded corner portion 44 turns inwardly and is spaced radially inwardly from the edge 38' at the bottom face of the panel. The bend tangent point between flange 40 and the corner portion 44 is above the bottom face of the panel. The rounded corner portion 44 merely serves as a hinge for ribs 50. These are important features of the present invention.

With the fastener disposed in the position illustrated in FIG. 4, it is clinched or locked in position by the application thereto of a tool generally designated 56. Tool 56 has a shank portion 58 of greater diameter than socket 36 and a pilot portion 60 having a diameter slightly less than the diameter of socket 36. The pilot portion 60 terminates in a conical nose portion 62 having a concavity 64 at its extreme end. Concavity 64 is generally shaped to engage with the central apex portion 48 of the diaphragm. Concavity 64 is, however, not essential. The juncture of pilot portion 60 and shank 58 forms a shoulder 66 which is adapted to bear against the face 68 of recess 16 when the tool 56 is driven home in a downward direction. The provision of a shoulder such as shown at 16 is desirable in the case of fasteners for use with holes having a small diameter, less than 5/16", for example.

It will be observed that when the tool 56 is inserted in the socket as illustrated in FIG. 4, the central concavity 64 engages the apex 48 of the conically shaped portion 46 of the diaphragm and the shoulder 66 of tool 56 is spaced from the face 68 of recess 16. When downward pressure is applied to tool 56, the ribs 50 and abutments 52 are progressively turned or rotated downwardly and outwardly until they assume the flexed position illustrated in FIG. 5. Initially, when the ribs 50 progressively move toward a flattened position, it appears that they tend to thicken slightly primarily at the apex 48 and bending and distortion occur primarily at the rounded corner portion 44 because the edge of the aperture 38 radially confines the portion of flange 40 radially outwardly of the rounded corner portion 44. It will be noted that since the inwardly turned junction 44 between flange 40 and conical portion 46 is initially spaced radially inwardly from the bottom edge 38' of aperture 38, it does not unduly restrict the toggle action of ribs 50. However, as soon as the ribs 50 are turned in a downward direction beyond a position parallel to the plane of the panel, the elastic memory of the material in combination with the downward pressure applied by tool 56 causes the ribs to assume the downwardly inclined position generally designated in FIG. 5.

In the process of flexing from the position shown in FIG. 4 to the position shown in FIG. 5, the ribs 50 act as struts and produce a toggle action which effectively clinches the circumferentially spaced abutments 52 against the underside of the panel around the edge 38' of aperture 38 as shown in FIG. 5. In this condition of the diaphragm, the toggle action of ribs 50 and the tendency for the ribs to resist thickening or buckling which must occur if they flex from the position shown in FIG. 5 to that shown in FIG. 4 have the effect of retaining the ribs in the clinched or locked position illustrated in FIG. 5. However, this tendency of the ribs and diaphragm to resist thickening is preferably not relied upon exclusively for retaining the ribs in the clinched or locked position.

Preferably, the tool 56 is dimensioned such that the shoulder 66 is spaced axially from the conical nose portion 62 a distance so that the shoulder 66 is still spaced slightly from the surface 68 when the conical diaphragm portion 46 becomes inverted. The tool, however, is driven downwardly to a position wherein the shoulder 66 abuts the surface 68 and this causes the ribs and diaphragm to be stretched and stressed beyond the elastic limit of the material to thereby overcome its elastic memory and impart a permanent set to the material.

For example, the conical portion 46 of the diaphragm and the upper edges of ribs 50 in the free condition illustrated in FIG. 4 incline at an angle of about 45° to the horizontal. This inclination preferably lies in the range of about 40° to 50° to the horizontal. The conical portion 62 of the tool inclines to the horizontal at about the same angle. Now, referring to FIG. 5, it will be noted that the ribs 50 have been inverted to an extent such that the inclination of said upper edges is substantially reversed. The inversion of ribs 50 and the toggle action resulting therefrom in conjunction with the interference between the enlarged abutments 52 and the edge 38' of aperture 38 insures stressing the plastic beyond its elastic limit. This causes the enlarged abutments 52 to grip tightly against the underside of the panel around the edge 38' of aperture 38; and as a result, the fastener is securely and permanently mounted on the panel and the aperture 38. After a plurality of fasteners 10 are mounted on the panel 24 in aligned relation as shown in FIG. 1, the trim molding 34 is snapped into engagement with the fasteners in the manner illustrated in FIG. 5.

It will be observed from FIG. 5 that when the fastener is clinched or locked in position, the body portion 12 is bowed slightly toward the panel. The effect of this bowing increases the gripping action of abutments 52 and also insures a tight seal between aperture 38 and the inwardly tapered portion 42 of flange 40. It will be appreciated that although one particular form of fastener is illustrated and one particular application of this fastener is illustrated, the invention is not so limited. The fastener is adapted for mounting on any type of apertured panel and is not limited exclusively for securing trim moldings to body panels. Likewise, the general shape of the fastener need not be as illustrated, the primary features of the invention residing in the plastic construction of the fastener in combination with the radial ribs 50 with their circumferentially spaced outer ends 52 for clinching against the underside of the panel.

The fastener is characterized by several important features. Of primary importance is the fact that the ribs 50 are connected with the lower end of flange 40 such that upon inversion, they turn outwardly in much the same manner as the petals of a flower. The rotation of abutments 52 as caused by ribs 50 is relied upon to produce the clinching action.

In this connection, it will be appreciated that the sole function of diaphragm 46 is to close the spaces between ribs 50 so as to provide an imperforate fastener. If, in any particular application, sealing of aperture 38 is not essential, then diaphragm 46 need not be embodied in the fastener. In this case, the clinching action would be substantially the same and the fastener would differ structurally from that illustrated in the drawing only in that the spaces between ribs 50 and between their outer ends 52 would be open rather than closed. In either case, the abutments 52 and ribs 50 would be connected to the lower end of flange 40 so that upon inversion of ribs 50, the abutments 52 would be bodily rotated into clinching engagement with the bottom face of panel 24 around the edge 38' of aperture 38.

Another important feature of the fastener of this invention resides in the inclination of the ribs 50 to the horizontal. As pointed out above, the inclination of these ribs as molded preferably lies in the range of about 40° to 50°. When inclined to the horizontal at an angle of less than about 40°, there is a tendency for the ribs to flex back toward their original position after the fastener is clinched. On the other hand, if the inclination is too steep, then the ribs have a tendency to break when the fastener is clinched. In general, it can be stated that the steeper the inclination, the better will be the holding action.

Figure 7:
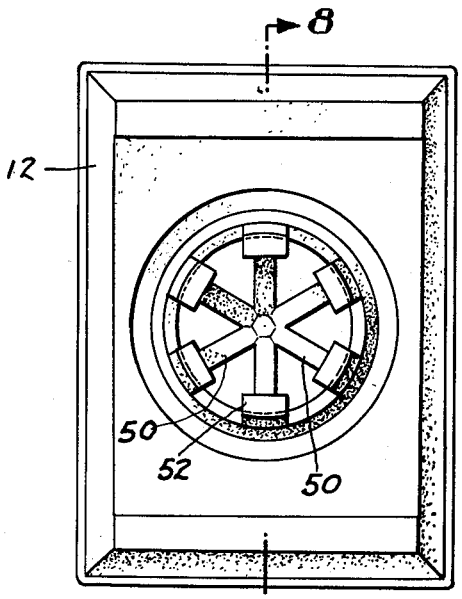
FIG. 7 is a bottom plan view of the fastener shown in FIG. 6.
Figure 8:
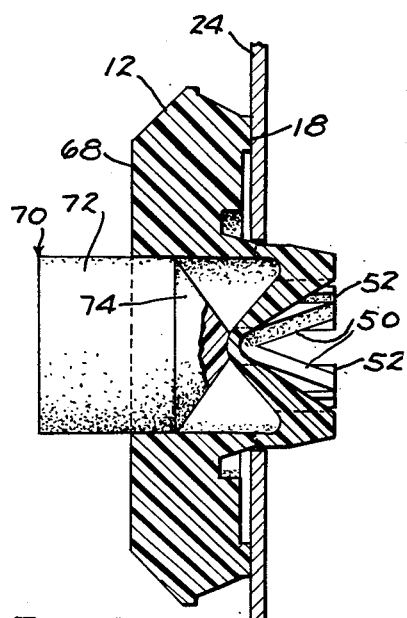
FIG. 8 is a sectional view taken along the line 8—8 in FIG. 7 and showing the fastener in the unclinched condition.
Figure 9:
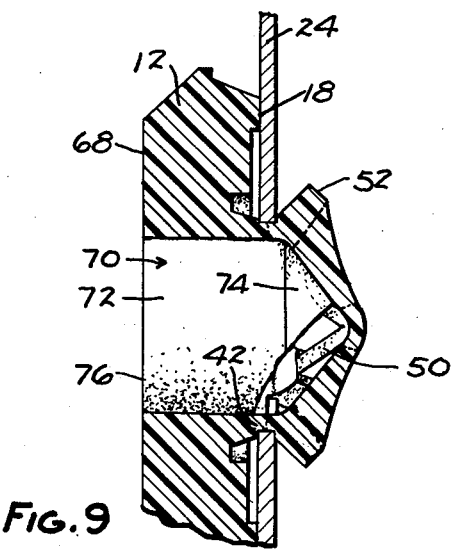
FIG. 9 is a view similar to FIG. 8 with parts broken away and showing the fastener in the clinched condition.

The fastener illustrated in FIGS. 6 through 9 is formed without the diaphragm designated 46 in the previous embodiment illustrated. Also, in this form of fastener, a plastic plug 70 is utilized for clinching the ribs 50 rather than a tool such as illustrated in FIGS. 4 and 5. Plug 70 has a cylindrical body 72 fashioned with a conical nose 74 (similar to tool 56) and is dimensioned such that when it is driven down into the fastener such that the upper end 76 is flush with the top face 68 of the fastener, the ribs 50 and abutments 52 are clinched in place. When a plug such as shown at 70 is used, it serves as an indication as to whether the fastener is clinched and also serves as a seal member for the fastener.

We claim:

1. A fastener adapted for mounting on an apertured panel, the fastener being molded from a resilient plastic material which is adapted to flex and flow under moderate pressure exerted by a hand tool, said fastener including a body member having portions on the bottom side thereof adapted to seat against one face of the apertured panel, said body portion having an aperture therethrough, the aperture being open at the top or upper side of the body member and having a plurality of radially inwardly extending ribs at the lower end thereof, said ribs being inclined upwardly in a radially inward direction, the outer ends of said ribs being spaced apart circumferentially about the periphery of said aperture, said outer ends being connected to said body member at the lower end of said aperture by means of a flexible connection, said ribs having their inner ends interconnected so as to form struts which, when the fastener is seated against an apertured panel with said aperture aligned with an aperture in the panel and the inner ends of said ribs are displaced axially downwardly about said flexible connection through the aperture in the panel to a level below said flexible connection, provide a toggle action which causes the outer ends of the ribs to tightly clinch against the underside of the panel at the edge of the aperture therein, the aperture in the body member being defined by a hollow shank extending downwardly from the bottom face of the body member beyond said panel engaging portions a distance no greater than the thickness of the panel, said shank being adapted to project into and terminate within the aperture in the panel and said ribs being connected at their outer ends to the lower end of said shank.

2. A fastener as called for in claim 1 wherein the inner ends of the ribs are in abutting relation.

3. A fastener as called for in claim 1 wherein the ribs have a greater axial dimension at their outer ends than at their inner ends.

4. A fastener as called for in claim 1 wherein the ribs are circumferentially enlarged at their outer ends.

5. A fastener as called for in claim 1 wherein said ribs are circumferentially and axially enlarged at their outer ends.

6. A fastener as called for in claim 1 wherein said ribs are of sufficient cross sectional size to resist lengthwise buckling when clinched.

7. A fastener as called for in claim 1 including a diaphragm portion connected to the lower end of said hollow shank and closing the spaces between the ribs whereby to close the opening at the lower end of the shank.

8. A fastener adapted for mounting on a panel of predetermined thickness and having an aperture therethrough of predetermined diameter, said fastener being molded from a resilient plastic material which is adapted to flex and flow under moderate pressure exerted by a hand tool, said fastener comprising an apertured body portion engageable with one side of the panel, a hollow shank portion extending axially from the body portion for insertion into the aperture and having a length no greater than said predetermined thickness and a diameter less than said predetermined diameter, a plurality of radially extending ribs having a flexible connection with the lower end of said shank portion at their outer ends, said outer ends of the ribs being spaced apart circumferentially, said ribs inclining radially inwardly and axially toward said side of the panel, said ribs being relatively rigid in a radial direction so as to form struts and said flexible connection being sufficiently flexible to permit angular displacement of the ribs relative to the lower end of said portion about said flexible connection to a position on the opposite side of the plane of said flexible connection and reversely inclined, said ribs being spaced apart circumferentially at their outer ends and the outer ends of said ribs forming circumferentially spaced abutments around the lower end of the shank portion which, when the ribs are angularly displaced as previously indicated, rotate outwardly about said flexible connection into tight engagement with the underside of the panel at circumferentially spaced points at the edge of the aperture therein and are retained in said position by the toggle action of the ribs.

9. A fastener as called for in claim 8 wherein said ribs are interconnected at their inner ends.

10. A fastener as called for in claim 8 wherein said ribs are of equal length and each rib has a length greater than half the cross dimension of the hollow shank portion.

11. A fastener as called for in claim 8 wherein the outer surface of said shank portion is conically shaped adjacent its connection with the body member so as to seal with the aperture in the panel when the shank portion is inserted into said aperture.

12. A fastener adapted for mounting on a panel of predetermined thickness having an aperture therethrough of predetermined size, said fastener being molded from a resilient plastic material which is adapted to flex and flow under moderate pressure exerted by a hand tool, the fastener including a body member having portions on the bottom side thereof adapted to seat against the apertured panel, said body member having a socket therein which is open at the top, the lower end of the socket being defined by a peripheral wall projecting axially from the bottom of the body member and adapted to project into and terminate within, as distinguished from beyond, the plane of the aperture in the panel, a plurality of individual struts, means forming a flexible connection between each strut and the lower edge of said peripheral wall, said struts extending radially from said peripheral wall to approximately the central axis of the socket, each strut also extending axially in said socket toward the upper end of the socket for a distance such that the effective length of each strut as measured from its connection with said peripheral wall to the upper end thereof adjacent the central axis of the socket is greater than half the cross dimension of the socket at the plane of said flexible connections, each of said struts having a cross section sufficient to resist lengthwise buckling when the struts are flexed downwardly as a group about said flexible connections to a toggled position below the plane of said flexible connections, there being a space between adjacent struts at the portions thereof immediately adjacent the edge of the aperture in the panel whereby when the struts are flexed downwardly about said flexible connections, the edge of the opening in the panel and the bottom of the panel immediately adjacent said edge are engaged at peripherally spaced points by the spaced apart portions of the struts at said flexible connections.

13. A fastener as called for in claim 12 wherein the struts also extend axially downwardly from said flexible connections, said downwardly extending portions of the struts comprising the portions thereof which engage the edge of the aperture in the panel and the bottom side of the panel.

14. A fastener as called for in claim 12 wherein said struts are inclined to the horizontal at an angle of between about 40° and 50°.

15. A fastener as called for in claim 12 wherein said struts are inclined to the horizontal at an angle of about 45°.

16. A fastener as called for in claim 12 including a plug in said socket and having a generally conical nose portion reversely positioned relative to the inclined struts, said plug being dimensioned such that when driven downwardly into the socket to displace said struts to said position engaging the edge of the opening in the panel, the upper end of the plug is substantially flush with the top face of the fastener body.

References Cited by the Examiner

UNITED STATES PATENTS

| 2,358,578 | 9/44 | Keehn | 85—40 |
| 2,948,937 | 8/60 | Rapata | 85—40 |
| 3,006,049 | 10/61 | Jansson | 24—73 |

FOREIGN PATENTS

| 1,239,607 | 7/60 | France. |

EDWARD C. ALLEN, *Primary Examiner.*

CARL W. TOMLIN, *Examiner.*